J. HOBART.
CORN HARVESTER.
APPLICATION FILED AUG. 15, 1913.
1,178,013.
Patented Apr. 4, 1916.
2 SHEETS—SHEET 2.
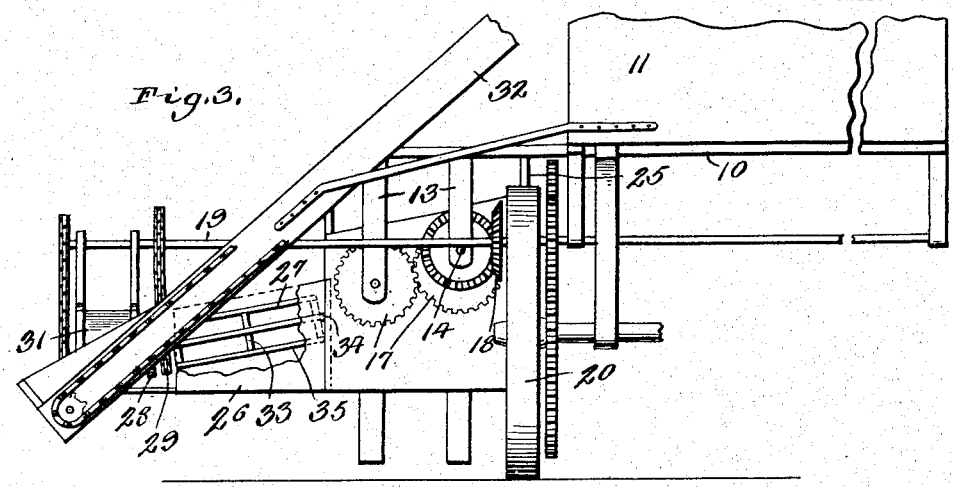
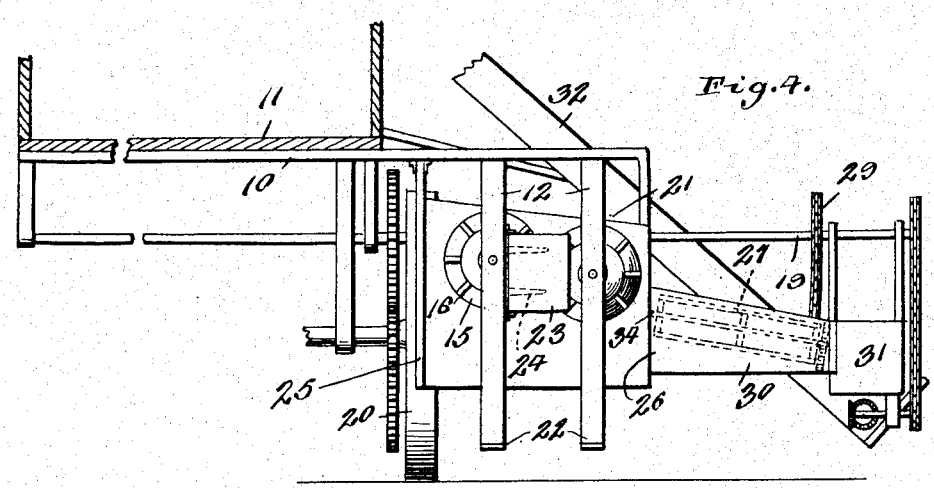
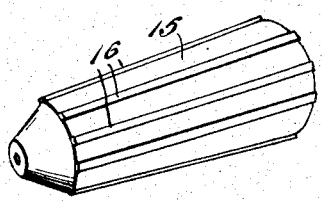
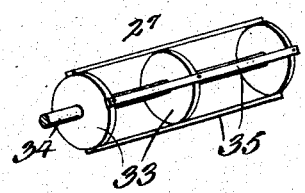
Inventor
J. Hobart,
Witnesses
By Victor J. Evans
Attorney
THE COLUMBIA PLANOGRAPH CO., WASHINGTON, D. C.

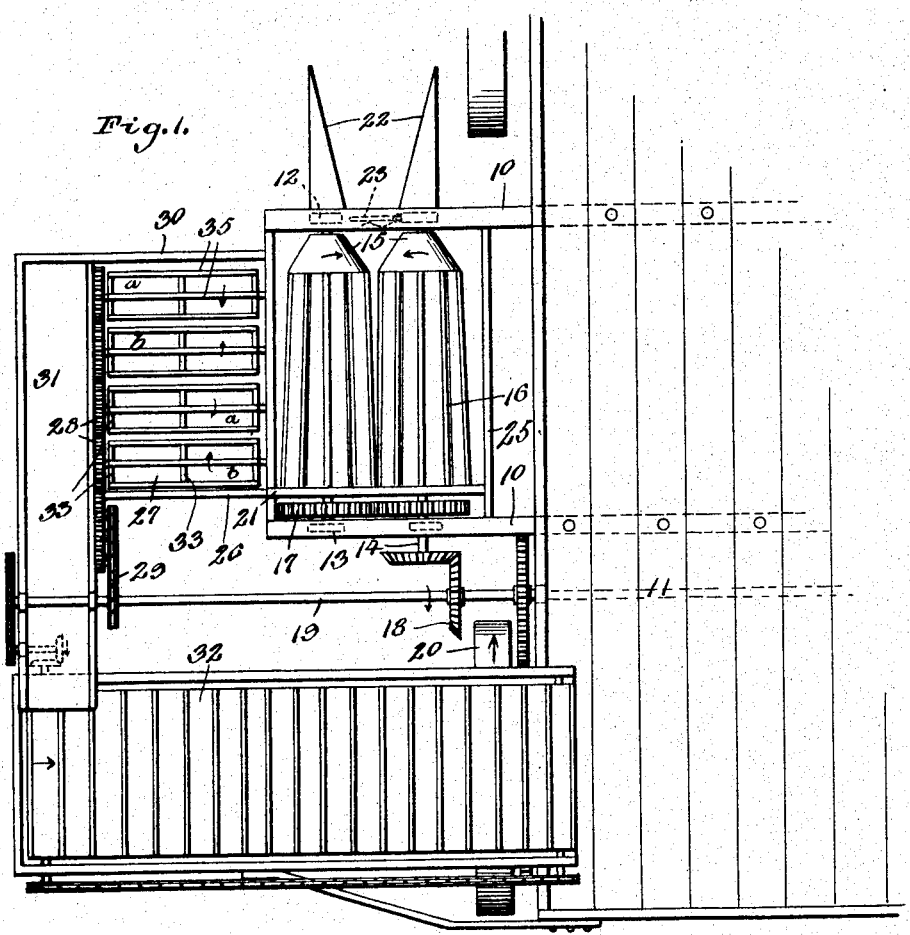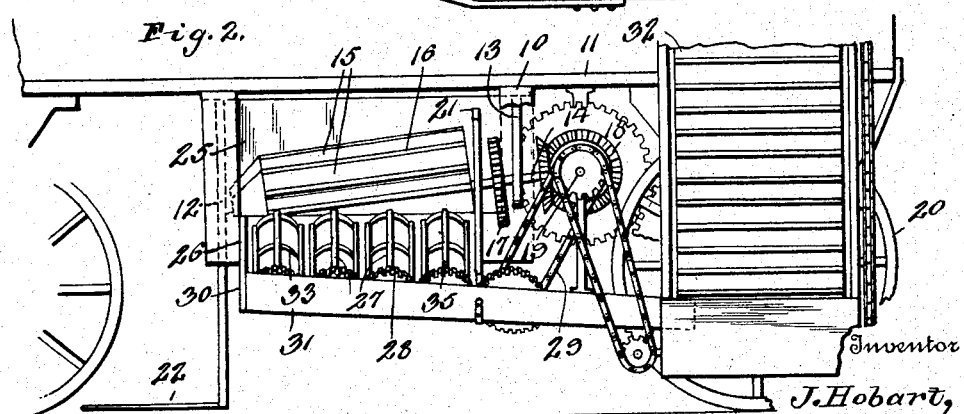

UNITED STATES PATENT OFFICE.

JOHN HOBART, OF MINNEAPOLIS, MINNESOTA.

CORN-HARVESTER.

1,178,013.  Specification of Letters Patent.  Patented Apr. 4, 1916.

Application filed August 15, 1913. Serial No. 784,977.

*To all whom it may concern:*

Be it known that I, JOHN HOBART, a citizen of the United States, residing at Minneapolis, in the county of Hennepin and State of Minnesota, have invented new and useful Improvements in Corn-Harvesters, of which the following is a specification.

This invention relates to corn harvesters, and it has particular reference to that type of machines in which the ears are detached from the stalks while the latter are standing in the field, the stalks being left behind, and the ears being subjected to the action of the husk detaching means previous to being deposited in a receptacle.

The present invention has for its object to produce a simple and efficient machine of the type described which may be attached to and operated in connection with an ordinary farm wagon, the box of which constitutes the receptacle into which the husked ears are detached.

A further object of the invention is to simplify and improve the construction and arrangement of the detailed parts of the machine.

With these and other ends in view which will readily appear as the nature of the invention is better understood, the same consists in the improved construction and novel arrangement and combination of parts which will be hereinafter fully described and paricularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view, showing a machine constructed in accordance with the invention mounted in position for operation. Fig. 2 is a side elevation of the same. Fig. 3 is a rear elevation. Fig. 4 is a front view. Fig. 5 is a perspective detail view of one of the snapping rolls. Fig. 6 is a perspective detail view of one of the husking rolls.

Corresponding parts in the several figures are denoted by like characters of reference.

The frame of the machine includes supporting bars 10 which may extend across the body of a farm wagon 11 where they are clamped and firmly secured in any suitable and convenient manner. The supporting bars have downwardly extending front bars 12 and rear bars 13, said front and rear bars affording bearings for the front and rear ends of the shafts 14 supporting the snapping rolls 15. Said snapping rolls are made tapering, as shown, and are constructed with longitudinally disposed ribs 16. The rear ends of the snapping rolls 15 are made to practically contact with each other, and said rolls are provided at their rear ends with intermeshing spur wheels 17, whereby they will be rotated in opposite directions, said rolls being driven in such fashion that the upper portions of the two rolls shall move in the direction of the medial line between the rolls. One of the rolls 15 receives motion by suitable transmission gearing 18 from a shaft 19 which is driven by power derived from one of the wheels 20 of the wagon in connection with which the invention is employed, any suitable, well known and convenient gearing being provided for the purpose of transmitting the power.

It will be seen by reference to the drawings that the snapping rolls are mounted or disposed in an inclined position, the front ends of said rolls being considerably lower than the rear ends thereof; this is in order to enable the corn stalks to be engaged by said rolls a relatively short distance above the ground. Owing to the tapering form of the rolls the corn stalks will readily be guided therebetween, and the ears be snapped therefrom, the stalks being wrung or buckled downwardly between the rolls by the joint action thereof. A cross bar 21 supported above the rolls adjacent to the rear ends thereof will positively obstruct the passage of the corn stalk rearwardly between the rolls, compelling even the tallest stalks to pass downwardly between the rolls and beneath the cross bar 21, so that every ear will be reached and acted upon without respect to its location.

Guides 22 are supported adjacent to the front ends of the rolls for the purpose of guiding the stalks therebetween. Pivotally supported adjacent to the front end of one of the rolls is a spring-actuated gate 23 which will open rearwardly under the pressure of the corn stalks as they enter between the rolls, but which will be automatically closed by the tension of its actuating springs 24 when released from the contact with the corn stalks. This gate, together with a shield 25 which is supported adjacent to the snapping roll which is nearest the body of the wagon on which the invention is used and which may, therefore, be appropriately termed the "inner" roll, and the cross bar 21 will prevent ears that are detached from the stalks from being wasted or spilled on to the ground adjacent to the front or rear ends of the rolls or over the inner snapping roll between the latter and the wagon.

Supported by the frame bars 12 and 13 adjacent to the outer snapping roll is a downwardly and outwardly inclined frame 26 which, for convenience, will be designated as the husker frame and which affords bearings for several pairs of husking rolls 27, two pairs of such rolls being shown in the drawing, although it is understood that any desired number of pairs may be employed. The husking rolls may be provided with intermeshing gears 28, whereby the rolls $a$, $b$ of each pair are driven reversely to one another, and the entire set or battery of husking rolls derives motion by a suitable transmission gearing 29 from the driven shaft 19. The frame carrying the husking rolls is tilted or inclined in a downward and outward direction, and shields 30 are provided to prevent the ears from being spilled from said husking rolls on to the ground, the husked ears being discharged over the lower ends of the rolls into a chute 31, whereby said ears are delivered to an elevator 32 whereby the ears are conveyed to the wagon box or body 11.

The husking rolls include in their construction metallic rings 33 surrounding the shaft 34 and longitudinally disposed rectangular bars 35 which are riveted or otherwise suitably secured on the rings 33 and suitably spaced apart so that the sharp edges of said rectangular bars will operate to seize the husks and to strip the same from the ears.

From the foregoing description, taken in connection with the drawings hereto annexed, it will be seen that I have provided a simple, inexpensive and thoroughly effective machine whereby corn may be harvested by detaching the ears from the stalks, stripping the husks from the ears and delivering the latter into the box or body of a wagon, such as an ordinary farm wagon on which the improved machine has been mounted for operation.

Having thus described the invention, what is claimed as new, is:

1. In a corn harvesting attachment for farm wagons, a pair of supporting bars extending transversely across and beyond the wagon box, front and rear bars depending therefrom, downwardly and forwardly inclined snapping rolls supported for rotation in said front and rear bars, said snapping rolls having intermeshing gears, means for driving the same, and an obstructing bar supported transversely above and adjacent to the rear ends of the snapping rolls.

2. In a corn harvesting attachment for farm wagons, a pair of supporting bars extending transversely across and beyond the wagon box, inner and outer front and rear bars depending from the projecting portions of the supporting bars, snapping rolls supported for rotation in said front and rear bars, said snapping rolls having intermeshing gears, means for driving the same, means supported transversely above and adjacent to the rear ends of the snapping rolls to obstruct the passage of stalks rearwardly therebetween, a husker frame supported on the outermost depending front and rear bars and inclined downwardly and outwardly, driven husking rolls supported for rotation in said frame, an inclined chute supported adjacent to the lower end of the husker frame to receive the overflow of the husking rolls, and an elevator to convey such overflow to the wagon box.

In testimony whereof I affix my signature in presence of two witnesses.

JOHN HOBART.

Witnesses:
FRANK W. POWELL,
HELMER HANSEN.

Copies of this patent may be obtained for five cents each, by addressing the "Commissioner of Patents, Washington, D. C."